3,468,949
BROMINATION PROCESS
Vincent Lamberti, Upper Saddle River, and Henry Lemaire, Leonia, N.J., assignors to Lever Brothers Company, New York, N.Y., a corporation of Maine
No Drawing. Filed Mar. 24, 1967, Ser. No. 625,583
Int. Cl. C07c *103/22*
U.S. Cl. 260—559                                    10 Claims

ABSTRACT OF THE DISCLOSURE

A process for the bromination of salicylanilide, 5-monobromosalicylanilide or 4',5-dibromosalicylanilide with bromine which utilizes one or more $C_6$ to about $C_{18}$ saturated monocarboxylic acids and esters thereof with $C_1$ to about $C_{16}$ mono-, di- or trihydric alcohols as the reaction medium in the liquid state in order to produce a high yield of a light colored germicidal mixture of reaction products rich in 3,4',5-tribromosalicylanilide without being encumbered by the usual solvent-recovery and solvent-purification problems.

---

The present invention relates to a bromination process and more particularly to a process for the bromination of salicylanilide, 5-monobromosalicylanilide or 4',5-dibromosalicylanilide to produce a mixture of the brominated derivatives of salicylanilide composed predominantly of 3,4',5-tribromosalicylanilide using a novel reaction medium.

Heretofore, a variety of aqueous and non-aqueous reaction media has been used in the bromination of salicylanilide with liquid bromine. Typical examples of such aqueous reacton media include aqueous benzene, aqueous chlorinated hydrocarbons, aqueous paradioxane, aqueous alcohol, aqueous acetic acid and aqueous surfactants (U.S. Patents Nos. 2,997,502, 3,057,920, 3,064,048, 3,149,156, 3,149,157 and 3,152,177). The use of such aqueous reaction media in the bromination of salicylanilide with liquid bromine favors either the producton of a predominant amount of 4',5-dibromosalicylanilide or a predominant amount of 3,4',5-tribromosalicylanilide depending in part upon the nature of the reaction medium employed and in part on the stoichiometry.

A substantially non-aqueous reaction medium utilized heretofore in the bromination of salicylanilide with liquid bromine which is of particular interest is a short chain saturated monocarboxylic acid, namely glacial acetic aicd having a concentration of 99.5% acetic acid (Belgian Patent No. 516,037 and U.S. Patent No. 2,802,029). Such a glacial acetic acid reaction medium, however, is disadvantageous in that a low yield (about 58–67%) of total insoluble brominated product is obtained which contains a low amount (about 61–73%) of 3,4',5-tribromosalicylanilide.

Therefore, it is an object of the present invention to provide a process for the preparation of a light colored mixture of brominated derivatives of salicylanilide in a high yield of about 82–87% composed predominantly, i.e., about 78% to 95% by weight, of 3,4',5-tribromosalicylanilide by utilizing a novel non-aqueous reaction medium in the liquid state which is one or more high molecular weight saturated monocarboxylic acids and esters thereof. Further objects are the provision of such a bromination process wherein the reaction medium is easy to recycle without purification and wherein the brominated products and reaction medium can be directly incorporated in commercially desirable antibacterial products for cleaning or treating surfaces, such as soaps, soap-nonsoap detergent mixtures, or cosmetic preparations, without isolation of the germicidal brominated products from the reaction medium.

In accordance with the process of the invention salicylanilide, 5-monobromosalicylanilide or 4',5-dibromosalicylanilide is brominated with a stoichiometric amount of liquid bromine in a reaction medium which is in the liquid state and which is at least one saturated monocarboxylic acid having from 6 to about 18 carbon atoms and esters thereof with alcohols having from 1 to 3 hydroxyl groups and from 1 to about 16 carbon atoms.

The term "stoichiometric amount" as used herein means about 3–3.5 moles of bromine per mole of salicylanilide starting material, about 2–2.4 moles of bromine per mole of 5-monobromosalicylanilide starting material and about 1–1.2 moles of bromine per mole of 4',5-dibromosalicylanilide starting material.

Salicylanilide, 5-monobromosalicylanilide, 4',5-dibromosalicylanilide and 3,4',5-tribromosalicylanilide are insoluble in the reaction medium at reaction temperatures. Stirring therefore is essential throughout the reaction in order to keep the system uniform. Enough of the reaction medium should be used to ensure complete suspension of the salicylanilide, 5-monobromosalicylanilide or 4',5-dibromosalicylanilide, but apart from this the amount is in no way critical. The larger the volume of the reaction medium, the more difficult the mix is to handle and the more dilute will be the suspension, so that the reaction will proceed more slowly. A reaction medium having a concentration of less than about 5% salicylanilide, 5-monobromosalicylanilide or 4',5-dibromosalicylanilide, thus would not normally be used. At a concentration in excess of about 20% the reaction mixture becomes quite thick and difficult to stir. Generally a concentration of from about 8% to about 15% is employed.

The reaction proceeds smoothly at a temperature within the range from about 40° C. to about 75° C. Generally from about 50° C. to about 65° C. or slightly higher is employed, since at the more elevated temperature the color of the product may be dark. At temperatures below 40° C. the reaction proceeds too slowly to be practical, and also some of the reaction media may be solid below 40° C. The reaction is conducted at atmospheric pressure or slightly higher.

The bromine can be added either rapidly, for example within about 5 minutes, or it can be added dropwise or in small increments over a period from about ½ to 3 hours. A reverse addition procedure can also be used. After all the bromine has been added, the reaction mixture is held at the reaction temperature for sufficient time to allow the reaction to proceed to completion, usually in about ½ to 3 hours' time. Unreacted bromine and residual hydrogen bromide can be removed by bubbling a stream of gas, such as nitrogen or carbon dioxide, through the liquid or molten reaction medium. The reaction mixture then can be filtered hot to remove the brominated product which also is insoluble in the reaction medium. The filter cake then may be washed, for example, with petroleum ether, and dried.

The saturated monocarboxylic acids having from 6 to about 18 carbon atoms include the natural or synthetic, straight or branched, odd or even number, compounds, for example, caproic acid, oenanthic acid, caprylic acid, pelargonic acid, capric acid, lauric acid, tridecoic acid, myristic acid, palmitic acid, margaric acid, stearic acid and tridecanoic acid such as obtained by the Koch reaction of alpha olefins. Mixed saturated monocarboxylic acids having odd or even number of carbon atoms can also be used as the reaction medium, such as Emersol 132 which is a mixture of palmitic and stearic acids, and lauric-myristic acid mixtures. Moreover, the reaction medium may be esters of such acids with $C_1$ to about $C_{16}$ mono-, di-, or trihydric alcohols, such as methanol, ethanol, hexanol, ethylene glycol, hexylene glycol, polyethylene glycols having 4 or 6 carbon atoms, glycerol, etc. Typical examples of these esters include the well known fully hydrogenated or hardened oils such as coconut oil, palm oil, tallow and other glycerides; the glycerol triester of tridecanoic acid prepared by the Koch reaction of alpha olefins; ethyl laurate, hexyl caproate, propyl myristate, methyl palmitate, pentyl stearate, cetyl palmitate and the like.

The process of the invention will be illustrated by the following representative examples.

Examples 1–8

A suspension of one mole (213 grams) of salicylanilide in 1,500 grams of the liquid or liquefied (molten) saturated monocarboxylic acids or esters thereof set forth in the table below is heated to 60–75° C. 3.5 moles (560 grams) of liquid bromine is then added dropwise over a 60–90 minute period in Examples 2–5 and 8 and added rapidly in 1–2 minutes in Examples 1, 6 and 7 while stirring and maintaining the temperature of the suspension at 60–75° C. Heating at 60–65° C. is continued for two hours. Any hydrogen bromide and unreacted bromine are removed by bubbling a stream of nitrogen through the melt. The brominated product is then isolated by filtering while hot and the filter cake is washed with petroleum ether and dried.

The yield and analyses of the light colored (cream) salicylanilide products isolated are set forth in the following table. An additional quantity, about 10% or more of the theoretical yield, depending upon the relative amount of reaction medium, remains in the fatty acid or ester filtrate. This material which consists predominantly of 3,4′,5-tribromo-, and 4′,5-dibromosalicylanilide is recovered upon reuse of the filtrate as the reaction medium for a subsequent batch. The isomer distribution in the products of Examples 1–8 is determined by ion-exchange chromatography and ultraviolet light spectrophotometric analyses. Since these analytical techniques do not employ a subtraction method but acutally test for each of the various isomers individually, there is a standard deviation which causes the reported total isomer distribution to vary from slightly below to slightly above 100%. Examples 6–8 in the following table are comparative examples using a low molecular weight saturated monocarboxylic acid, namely glacial acetic acid, as the reaction medium.

Example 10

A suspension of one mole (292 gm.) of 5-mono-bromosalicylanilide in 1,500 grams of cetyl palmitate is heated to 65° C. 2.4 moles (384 gm.) of liquid bromine is added in increments of approximately 5 grams each over a period of 60 minutes. During this time the suspension is stirred and the temperature is maintained at 65° C. to 70° C. After the completion of the bromine addition, the stirring is continued for two hours, while continuing to maintain the temperature at 65° C. to 70° C. Any hydrogen bromide and unreacted bromine are removed by bubbling a stream of carbon dioxide through the molten material. The insoluble matter is isolated by filtration, washed with petroleum ether, dried and weighed.

Example 11

A suspension of one mole (371 gm.) of 4′,5-dibromosalicylanilide in 1,700 grams of the glycerol triester of tridecanoic acid prepared by the Koch reaction of alpha olefins is heated to 65° C. and 1.2 moles (192 gm.) of liquid bromine is added in a slow continuous stream. The procedure followed from this point is the same as described under Example 10.

Yields of isolated product prepared as described in Examples 10 and 11 are typically about 85%–87% of a product containing about 78%–95% of 3,4′,5-tribromosalicylanilide. Since the brominated products have some solubility in the reaction medium, the figures shown do not include all of the reaction product, which would be utilized in its entirely in practice, where the reaction medium would either be used in a composition wherein the germicide is desired, or would be used, after filtration, for a subsequent bromination batch.

It will be noted from the data set forth in the above examples that the use of a high molecular weight saturated monocarboxylic acid or ester thereof as the reaction medium for the bromination of salicylanilide results in a high yield of total insoluble brominated product (about 82–87%), and a high amount of the desirable 3,4′,5-tribromosalicylanilide therein (about 78–95%), whereas the use of low molecular weight glacial acetic acid under the same conditions results in a low yield of total insoluble brominated product (about 58–67%) and a low amount of the desirable 3,4′,5-tribromosalicylanilide therein (about 61–73%). Moreover, in utilizing glacial acetic acid as the reaction medium it was found that the filtrate contains a significant proportion (about 22–30%) of the brominated product (containing a high proportion of

ISOMER DISTRIBUTION (PERCENT)

| Example No. | Suspension Medium | Yield (percent) | 5 | 4′,5 | 2′,3,5 | 2′,4,5 | 3,4′,5 | 2′,3,4′,5 |
|---|---|---|---|---|---|---|---|---|
| 1 | Lauric acid | 87 | | 3.6 | | | 94.7 | 0.9 |
| 2 | do | 84 | Trace | 10.6 | 2.5 | Trace | 89.4 | 0.1 |
| 3 | Caprylic acid | 85 | 0.2 | 20.6 | | 0.2 | 78.2 | |
| 4 | Emersol 132 (palmitic/stearic acid mixture) | 85 | 0.4 | 13.7 | 1.0 | 0.4 | 82.0 | 0.5 |
| 5 | Fully hydrogenated coconut oil | 82 | 0.4 | 17.6 | | 0.4 | 78.2 | 0.6 |
| 6 | Glacial acetic acid | 67 | | 34.4 | | 0.8 | 62.8 | Trace |
| 7 | do | 58 | | 25.3 | | 0.4 | 72.8 | |
| 8 | do | 66 | 0.1 | 38.1 | | 0.3 | 61.3 | |

Example 9

Employing the general reaction procedure set forth above in Examples 1–8 but using a reaction temperature of 65° C., three moles of liquid bromine is reacted with one mole of salicylanilide in fully hardened tallow as the reaction medium. This reaction temperature is maintained at the upper end of the preferred range due to the relatively high melting point of fully hardened tallow (M.P.=57–61° C.). The product yield resulting from use of fully hardened tallow is above 80%, typically 82–87% with over 78% of such product composed of 3,4′,5-tribromosalicylanilide.

3,4′,5-tribromosalicylanilide) which is somewhat soluble therein and hence the filtrate has to be either diluted with water or distilled to recover this additional material. This introduces extra costs. Conversely, with the high molecular weight saturated monocarboxylic acid or ester reaction media the bulk of the brominated product can be filtered from the melt. The filtrate could thus be recycled without isolating the small portion of soluble brominated fraction.

When the reaction medium of the process of the present invention is one or more high molecular weight saturated fatty acids or fats, the reaction mixture containing such reaction medium and brominated products can be directly incorporated in commercially desirable antibacterial products for cleaning or treating surfaces without having to isolate the germicidal brominated product from the reaction medium.

It will be appreciated that various modifications and changes may be made in the process of the invention, in addition to those set forth above, by those skilled in the art without departing from the spirit of the invention and that accordingly the invention is to be limited only within the scope of the appended claims.

What is claimed is:

1. A process for preparing a mixture of brominated derivatives of salicylanilide composed predominantly of 3,4',5-tribromosalicylanilide which comprises brominating at a temperature from about 40° C. to about 75° C. salicylanilide, 5-monobromosalicylanilide or 4',5-dibromosalicylanilide with a stoichiometric amount of bromine in a stirred reaction medium which is in the liquid state selected from the group consisting of (1) at least one saturated monocarboxylic acid having from 6 to about 18 carbon atoms and (2) esters thereof with (a) monohydric alcohols having from 1 to about 16 carbon atoms, ethylene glycol, hexylene glycol, polyethylene glycol having 4 to 6 carbon atoms and glycerol; said stoichiometric amount being about 3–3.5 moles of bromine per mole of salicylanilide as the starting material, about 2–2.4 moles of bromine per mole of 5-monobromosalicylanilide as the starting material and about 1–1.2 moles of bromine per mole of 4',5-dibromosalicylanilide as the starting material.

2. The process in accordance with claim 1 wherein the bromine is added dropwise.

3. The process in accordance with claim 1 wherein the bromine is added rapidly.

4. The process in accordance with claim 1 wherein the reaction medium is lauric acid.

5. The process in accordance with claim 1 wherein the reaction medium is caprylic acid.

6. The process in accordance with claim 1 wherein the reaction medium is a mixture of palmitic and stearic acids.

7. The process in accordance with claim 1 wherein the reaction medium is a mixture of lauric and myristic acids.

8. The process in accordance with claim 1 wherein the reaction medium is fully hydrogenated coconut oil.

9. The process in accordance with claim 1 wherein the reaction medium is fully hydrogenated tallow.

10. The process in accordance with claim 1 wherein the material being brominated is salicylanilide.

References Cited
UNITED STATES PATENTS 3,064,048   11/1962   Schramm et al. _____ 260—559

HENRY R. JILES, Primary Examiner

H. J. MOATZ, Assistant Examiner